(12) United States Patent
Kundu

(10) Patent No.: US 7,181,681 B2
(45) Date of Patent: Feb. 20, 2007

(54) REALTIME WEB PAGE SCRAPPING AND VISUAL REPRESENTATION OF ASSOCIATED CLICKTHROUGH AND IMPRESSION DATA ARCHITECTURE

(75) Inventor: Abhijit Kundu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 373 days.

(21) Appl. No.: 10/767,503

(22) Filed: Jan. 28, 2004

(65) Prior Publication Data

US 2005/0166138 A1 Jul. 28, 2005

(51) Int. Cl.
*G06F 15/00* (2006.01)

(52) U.S. Cl. ............... 715/501.1; 709/219; 709/226
(58) Field of Classification Search ............ 715/500.1, 715/501.1; 709/219, 226
See application file for complete search history.

(56) References Cited

U.S. PATENT DOCUMENTS

| | | | | |
|---|---|---|---|---|
| 6,108,703 | A * | 8/2000 | Leighton et al. | 709/226 |
| 6,134,584 | A * | 10/2000 | Chang et al. | 709/219 |
| 6,163,779 | A * | 12/2000 | Mantha et al. | 707/100 |
| 6,301,614 | B1 * | 10/2001 | Najork et al. | 709/223 |
| 6,792,458 | B1 * | 9/2004 | Muret et al. | 709/224 |
| 2004/0059997 | A1 * | 3/2004 | Allen et al. | 715/501.1 |
| 2004/0068435 | A1 * | 4/2004 | Braunzell | 705/14 |
| 2004/0243536 | A1 * | 12/2004 | Jensen et al. | 707/1 |

OTHER PUBLICATIONS

Web Sevrver "Visitor Tracking" Log Analyzer, Feb. 8, 2002, <http://web.archive.org/web/20020208214319/http://users.actcom.co.il/~choo/lupg/project-ideas/weblog-analyzer.html>, pp. 1-4.*
SGD, "SGD Tutorial: GO Annotations", Dec. 6, 2003, pp. 1-11, <http://web.archive.org/web/20031206062603/http://www.yeastgenome.org/help/gotutorial.html>.*
"Web tracking invigorates firm's marketing efforts," *Communications News*, 2002, 40(2), 26.
Ball, T. et al., "An Internet Difference Engine and its applications," *COMPCON '96. Technologies for the Information Superhighway Digest of Papers*, Feb. 25-28, 1996, 71-76.
Beeferman, D. et al., "Agglomerative clustering of a search engine query log," *Proceedings of KDD-2000. Sixth ACM SIGKD International Conference on Knowledge Discovery and Data Mining*, Aug. 20-23, 2000, 407-416.
Detlor, B., "Internet-based information systems use in organizations: an information studies perspective," *Info. Systems J.*, 2003, 13(2), 113-132.
Gong, W. et al., "Measuring web advertising effectiveness in China," *J. Advertising Res.*, 2003, 43(1), 34-49.

(Continued)

*Primary Examiner*—Stephen Hong
*Assistant Examiner*—David Faber
(74) *Attorney, Agent, or Firm*—Woodcock Washburn LLP

(57) ABSTRACT

Systems and methods for visually displaying clickthrough, impression, and other data pertaining to webpages are provided. In various embodiments, such data can be displayed concurrently with a display of a tracked webpage. User indication of either an element on a tracked webpage or corresponding data can operate to visually highlight related features of the display. Implementation of the present invention may be accomplished by providing a user interface for retrieving downloaded webpages and corresponding data, a scheduler for scheduling the periodic download of tracked webpages, and one or more downloaders for downloading tracked webpages into a target directory.

12 Claims, 10 Drawing Sheets

OTHER PUBLICATIONS

Kitts, B. et al., "Cross-sell: a fast promotion-tunable customer-item recommendation method based on conditionally independent probabilities," *Proceedings of KDD-2000. Sixth ACM SIGKD International Conference on Knowledge Discovery and Data Mining*, Aug. 20-23, 2000, 437-446.

Scharl, A., "Explanation and exploration—Visualizing the topology of web information systems," *Int. J. Human-Computer Studies*, 2001, 55(3), 239-258.

Thiébaut, D.F., "Web tracking and graphing with Pgperl," *Computers in Physics*, 1996, 10(5), 420-425.

* cited by examiner

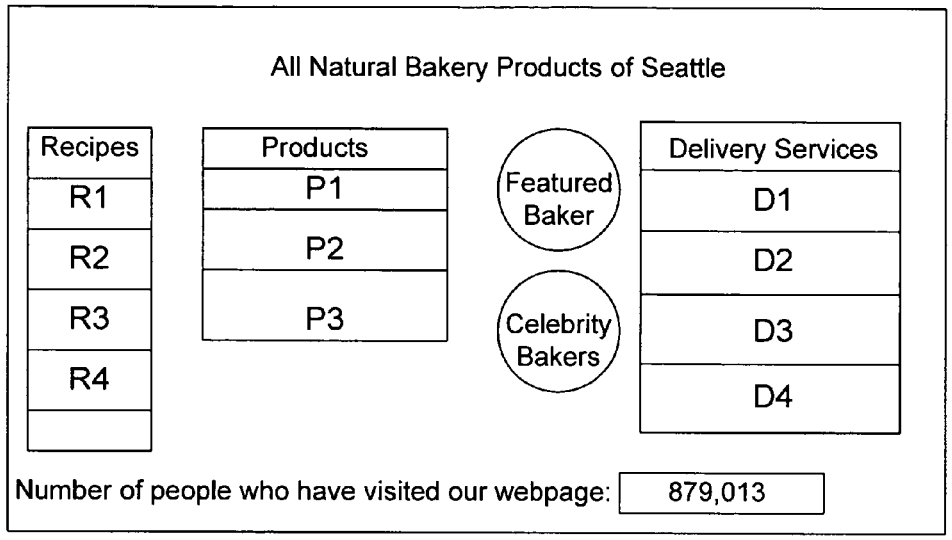

(PRIOR ART)

FIGURE 1(A)

| LINK | CLICKS |
|---|---|
| https://web.seattlebaking.com/recipes/get/muffins | 12 |
| https://web.seattlebaking.com/recipes/get/pancakes | 34 |
| https://web.seattlebaking.com/recipes/get/tortillas | 3 |
| https://web.seattlebaking.com/recipes/get/beignets | 0 |
| https://web.seattlebaking.com/bigshotbaker | 1098 |
| https://web.seattlebaking.com/featuredbaker/brooke | 549 |
| https://web.seattlebaking.com/delivery/home | 96 |
| https://web.seattlebaking.com/delivery/office | 516 |
| TOTAL CLICKS | 2308 |
| NUMBER OF TIMES WEBPAGE WAS ACCESSED (IMPRESSIONS) | 12,981 |

(PRIOR ART)

FIGURE 1(B)

Data Display

Link Data

| Link | Clicks |
|---|---|
| Link BA | 345 |
| Link 11 | 78 |
| Link 12 | 63 |
| Link 13 | 138 |
| Link 14 | 3 |
| Link 15 | 67 |
| Link E2 | 191 |

Content Module Data

| Module | Clicks |
|---|---|
| Banner | 345 |
| Content Module 1 | 565 |
| Content Module 2 | 34 |
| Breaking News | 223 |
| Editorials | 554 |

Demographic Data

| Age | Male | Female | All |
|---|---|---|---|
| <10 | 11% | 10% | 21% |
| 11-13 | 17% | 4% | 21% |
| 14-18 | 18% | 3% | 21% |
| 19-26 | 19% | 18% | 37% |
| 27-45 | 65% | 35% | 100% |

Webpage Display

Target Webpage: www.newspaper.com

BANNER ADVERTISEMENT (LinkBA)

CONTENT MODULE 1
- Content Element A
  - Link11
  - Link12
- Content Element B
  - Link13
  - Link14
- Content Element C
  - Link15
  - Link16
  - Link17

CONTENT MODULE 2
- Link21
- Link22
- Link23
- Link24
- Link25
- Link26

BREAKING NEWS: LinkN1, LinkN2

EDITORIALS: LinkE1, LinkE2

---

User indicates (e.g. by mouseover) Link E2 on the data display. This may:
- Highlight Link E2 in the data display,
- Highlight the corresponding content module ("Editorials"),
- Display demographic data for Link E2, and
- Highlight Link E2 in the webpage display.

User indicates (e.g. by mouseover) Link E2 on the webpage display. This may:
- Highlight Link E2 in the webpage display,
- Display demographic data for Link E2 in the data display,
- Highlight the corresponding content module in the data display ("Editorials"), and
- Highlight Link E2 in the data display.

FIGURE 1(C)

```
<config>
    <rootdirectory>C:\Inetpub\wwwroot\NetMetrix\RealTime\Historical</rootdirectory>
    <scriptfile>C:\Inetpub\wwwroot\NetMetrix\RealTime\Custom.js</scriptfile>
    <proxy>http://itgproxy:80</proxy>
    <downloadtimeout>10</downloadtimeout>
    <downloadretry>1</downloadretry>
    <exefullpathfile>C:\RealTime\PreviewQueue.exe</exefullpathfile>
    <connection>data source=cptrarpts04; initial catalog=RealTime_V2; trusted_connection=true; </connection>
</config>
```

FIGURE 6

```
<config>
    <delayed>True</delayed>
    <sourcepage>ca.msn.com/</sourcepage>
    <codepage>1252</codepage>
    <targetdirectory> C:\Inetpub\wwwroot\NetMetrix\RealTime\Historical \camsncom\03_26_2003_19</targetdirectory>
    <scriptfile>C:\RealTime\Custom.js</scriptfile>
    <proxy>http://itgproxy:80</proxy>
    <downloadtimeout>10</downloadtimeout>
    <downloadretry>1</downloadretry>
</config>
```

FIGURE 8

REALTIME WEB PAGE SCRAPPING AND VISUAL REPRESENTATION OF ASSOCIATED CLICKTHROUGH AND IMPRESSION DATA ARCHITECTURE

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2003, Microsoft Corp.

FIELD OF THE INVENTION

The present invention relates to monitoring networks, such as the Internet, and more particularly to gathering and displaying data about webpage usage and performance in real-time, and in a way which visually relates such data to the corresponding position of the webpage.

BACKGROUND OF THE INVENTION

Tracking of webpage and clickthrough data provides valuable information about the interests of the people who access a webpage. Tracking also provides useful statistics related to webpage performance and content quality. Providing clickthrough and impression data for webpages and the links thereon is known in the art. However, such information is typically presented in formats and displays that are not as accessible and digestible as could be. In light of the value and interest in gathering webpage and clickthrough data, there is a need to present this data in a way that is readily accessible and digestible by those who desire access to it.

FIG. 1(A) shows a typical prior art display of webpage impression data. Many webpages currently contain counters that are updated every time a webpage is accessed. This information is provided in real time to any user who views such a webpage. In FIG. 1(A), the counter is at the bottom of the illustrated webpage next to a text line: "number of people who have visited our webpage."

FIG. 1(B) shows a typical prior art view of clickthrough data. Referring to FIG. 1(B), observe that the data is displayed as might be expected of an initial attempt at presenting such data. The data is accessible via a table that corresponds a number of clicks to the names of corresponding links. The data of FIG. 1(B) could be presented on an electronic or paper print-out, and would typically be generated by one desiring to compile such information regarding websites that are owned and/or managed by the generator of the table. As such, a particular table display of clickthrough data may provide, as shown in FIG. 1(B), the total number of clicks on a particular link through a given date and time. Alternatively, it may display the number of clicks for a given interval. It may also provide the total number of clicks on all of the links, as shown, compared to the total number of impressions, which is often much higher, as shown in FIG. 1(B). The number of impressions divided by the total number of clicks is known as the "clickthrough rate."

One difficulty with prior art displays such as that of FIG. 1(B) is the link name may not be readily identifiable to a human desiring to assess performance of a webpage. This is especially true when a webpage contains numerous links or links that have similar looking names. While ultimately links with unique Uniform Resource Locators (URLs) can be traced to a corresponding link on the webpage, this process may entail a brief look-up on the part of a human who is assessing the link. This need for looking up links can make assessment of clickthrough data a less convenient task than it might be.

Another difficulty with prior art displays such as that of FIG. 1(B) is that links that relate to each other are not displayed in such a way as to readily indicate the relationship. For example, there may be a content module on a webpage that provides information about weather, and provides content elements of "weather in the west," "weather in the east," "weather in the north," and "weather in the south" (not illustrated). Each content element may then provide links to weather information in specific cities: "Seattle," "Los Angeles," "New York," "New Orleans," "Detroit," etc. An adjacent content module may provide information about traffic, and be broken down similarly into regions and cities. As may be imagined, these links to city-specific information may look similar, and it may not be clear from a display such as FIG. 1(B) which links fall into which content modules. This group and subgroup information can prove useful for website owners and managers, however, because they may care about the performance of content modules as well as the performance of individual links. It may become clear, for example, that content modules displaying particular pictures or graphically arranged in specific ways perform better than other content modules.

Yet another difficulty with prior art displays such as that of FIG. 1(B) is that they do not provide clickthrough data in real time. Also, they are not configured to display clickthrough data that relates the times when particular links are clicked. In light of the above shortcomings in the art, there exists a heretofore unaddressed need to provide better displays of webpage clickthrough and impression data.

SUMMARY OF THE INVENTION

Systems and methods for visually displaying clickthrough, impression, and other data pertaining to webpages are provided. In various embodiments, such data can be displayed concurrently with a display of a tracked webpage. The data may also be broken up into various views, for example, a view showing clickthrough data about particular links, a view showing clickthrough data about content modules and/or content elements, and a view showing demographic data about the people who clicked particular links. User indication of either an aspect of a tracked webpage or corresponding data in any of the potential views can operate to visually highlight related features of the display. Implementation of the present invention may be accomplished by providing a user interface for generating the adjacent display of a webpage and corresponding data by retrieving, preparing and displaying downloaded webpages and corresponding data. Implementation may also include a scheduler for scheduling the periodic download of tracked webpages, and/or one or more downloaders for downloading tracked webpages into a target directory.

BRIEF DESCRIPTION OF THE DRAWINGS

FIG. 1(A) is an illustration of a webpage with a "hit" or impression counter as is familiar in the art;

FIG. 1(B) is an illustration of a list of clickthrough data for the links of an imaginary webpage, as webpage data is often displayed in the prior art;

FIG. 1(C)) is an illustration of an exemplary interactive display in accordance with various embodiments of the invention;

FIG. 6 shows pseudocode demonstrating an exemplary config file that may be used in connection with a scheduler in accordance with the invention;

FIG. 8 shows pseudocode demonstrating an exemplary config file that may be used in connection with a downloader in accordance with the invention;

DETAILED DESCRIPTION OF ILLUSTRATIVE EMBODIMENTS

Certain specific details are set forth in the following description and figures to provide a thorough understanding of various embodiments of the invention. Certain well-known details often associated with computing technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

The present invention provides systems and methods for the display of clickthrough, impression, and other data pertaining to webpages. A number of related innovations that can be combined to facilitate access and display of data are described in this document. The invention itself is not limited to any single innovation or improvement upon the prior art described herein, nor is it limited to any particular combination of the various methods and systems provided. Instead, the reader will appreciate that various aspects of the present invention can be taken alone or in any number of sub combinations that improve upon the present state of the art.

The system provided herein facilitates assessment of data by displaying the data in a way that provides speedy recognition of a feature of a webpage to which the data applies. This in turn gives editors and content designers an advantage in modifying, enhancing, and targeting webpage content. A better understanding of user behavior can help in user retention. When provided in real time, the system is capable of providing a complete a feedback loop to understand users and their behaviors.

Figure 1D:
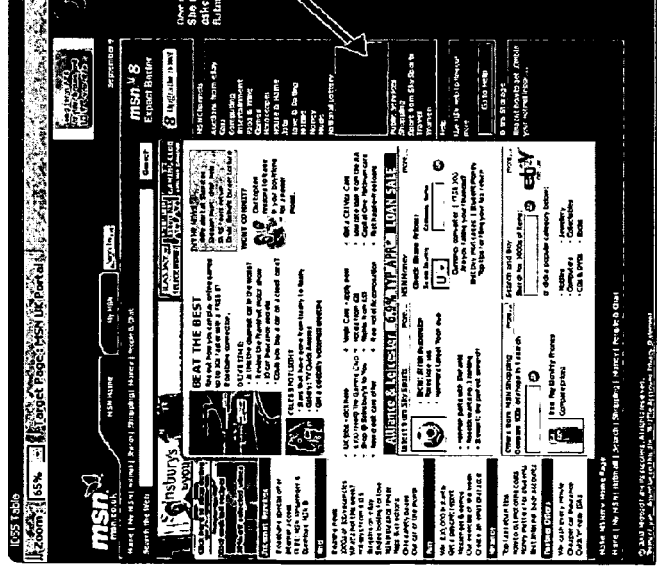
FIG. 1(D) is an more realistic version of the simplified illustration in FIG. 1(C).

FIG. 1(C) provides an exemplary view of various potential embodiments of the present invention. FIG. 1(C) is a representation of a computer screen display in accordance with the present invention. For another embodiment of the invention that shows a more realistic looking webpage, refer to FIG. 1(D). The display as seen in FIG. 1(C) is divided into a "data display" and a "webpage display." The data display can provide data about a webpage presented in the webpage display. For example, the data display can provide the number of times the webpage has been accessed ("impression data"), the number of times each link on the webpage was accessed (as in the link data box of FIG. 1(C)), and the number of times any link within a particular content module on the webpage was accessed (as in the content module data box of FIG. 1(C)—note that the term "content module" is used here to refer to a related group of links). The data display can also provide demographic information about the people who accessed the various links and content modules of the webpage (as in the demographic data box of FIG. 1(C)). It may be relevant and interesting that more men than women accessed the "News and Weather" link, for instance, or that more people over 50 accessed that link than any other age group. The above examples are not intended to limit the invention, as it will be recognized that any data can be displayed in the data display, and that data can be arranged in any useful manner, e.g., particular to the content being displayed and/or the manner in which the content is accessed or used.

In various embodiments, data can be displayed concurrently with a display of a tracked webpage, the "webpage display." User indication of an element on a tracked webpage can operate to visually highlight any corresponding data. The reverse may also be accomplished, in that user indication of a data element may visually highlight a corresponding tracked webpage element. By visually correlating webpage content with data, the invention facilitates assessment of webpage performance as well as assessment of any individual link, content module or content element.

Referring to FIG. 1(D), consider a hypothetical user (not shown), desiring access to data, who makes use of the present invention as shown in FIG. 1(D). The user may employ a mouse (mouse pointer not shown), or other selection device, to access the functionality of the display. If the user desires data about a "News and Weather" link on the webpage, the user may hover over ("mouseover"), or otherwise indicate the "News and Weather" link on the data display. This action can result in a visual highlight, as shown on FIG. 1(D), of a corresponding "News and Weather" link on the webpage display. Any means of highlighting the corresponding aspect of the webpage display may be employed; the method shown in FIG. 1(D) is simply one example. The large arrow pointing to the highlighted "News and Weather" link of the webpage display is for the purposes of illustration and is not necessarily employed to highlight the corresponding link. Because the corresponding "News and Weather" link is highlighted on the webpage display, the user can easily identify the link that he or she has selected on the data display.

Conversely, in another embodiment of the invention, a user can select a link on the webpage display of FIG. 1(D), e.g., the highlighted "News and Weather" link. Upon so doing, data in the data display about the "News and Weather" link can be highlighted. Again, any means of highlighting may be used.

In yet another embodiment, both of the highlighting functions described above can be employed in conjunction with the display. When the user is provided with two-way highlighting, the corresponding webpage link is highlighted when a user indicates data from the data display, and the corresponding data is highlighted when a user indicates a link from the webpage display. This technique greatly facilitates access to data as well as determination of which aspect of a webpage a given data element applies or corresponds to.

Figure 4:
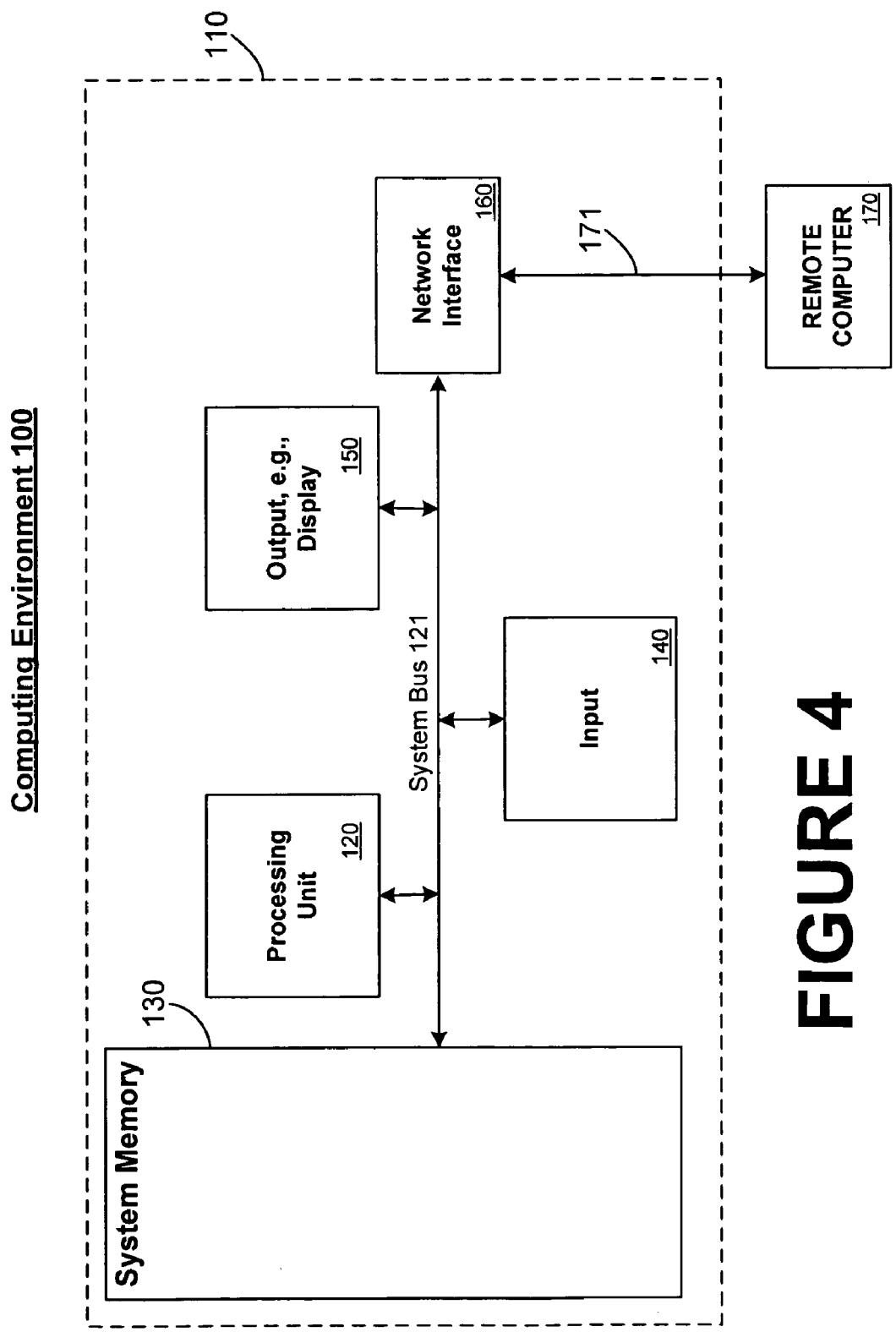
FIG. 4 is an exemplary computer in conjunction with which the present invention may be implemented.

The computer screen display of FIG. 1(C) may be implemented through any suitable combination of computer hardware and software, as will be appreciated by those skilled in the art. FIG. 4 and the following discussion are intended to provide a brief general description of a suitable computing environment in connection with which the invention may be implemented. It should be understood, however, that handheld, portable and other computing devices and computing objects of all kinds are contemplated for use in connection with the present invention, i.e., anywhere where that webpages can be stored, transferred, or displayed in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the data display techniques in accordance with the invention.

Although not required, the invention can be implemented via an operating system, for use by a developer of services for a device or object, and/or included within application software that operates in connection with the data display techniques of the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 4 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 4, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) and random access memory (RAM). A basic input/output system (BIOS), containing the basic routines that help to transfer information between elements within computer 110, such as during start-up, is typically stored in ROM. RAM typically contains data and/or program modules that are immediately accessible to and/or presently being operated on by processing unit 120. By way of example, and not limitation, a computer may also comprise an operating system, application programs, other program modules, and program data.

Any number of drives and associated computer storage media may be attached to the computer 110, and provide storage of computer readable instructions, data structures, program modules and other data for the computer 110. For example, a hard disk drive may store an operating system, application programs, other program modules and program data. A user may enter commands and information into the computer 110 through input devices such as a keyboard and pointing device, commonly referred to as a mouse, trackball or touch pad. Other input devices may include a microphone, joystick, game pad, satellite dish, scanner, or the like. These and other input devices are often connected to the processing unit 120 through a user input interface that is coupled to the system bus 121, but may be connected by other interface and bus structures, such as a parallel port, game port or a universal serial bus (USB). An output device such as display 150 may also be coupled to system bus 121, as illustrated.

The computer 110 may operate in a networked or distributed environment using logical connections to one or more remote computers, such as a remote computer 170. The remote computer 170 may be a personal computer, a server, a router, a network PC, a peer device or other common network node, and typically includes many or all of the elements described above relative to the computer 110. Networking environments are commonplace in homes, offices, enterprise-wide computer networks, intranets and the Internet.

When used in a LAN networking environment, the computer 110 is connected to the LAN 171 through a network interface or adapter 160. When used in a WAN networking environment, the computer 110 typically includes a modem or other means for establishing communications over the WAN, such as the Internet. The modem, which may be internal or external, may be connected to the system bus 121 via the user input interface 140, or other appropriate mechanism. In a networked environment, program modules depicted relative to the computer 110, or portions thereof, may be stored in the remote memory storage device. It should be appreciated that the network connections shown are exemplary and other means of establishing a communications link between the computers may be used.

Figure 2:
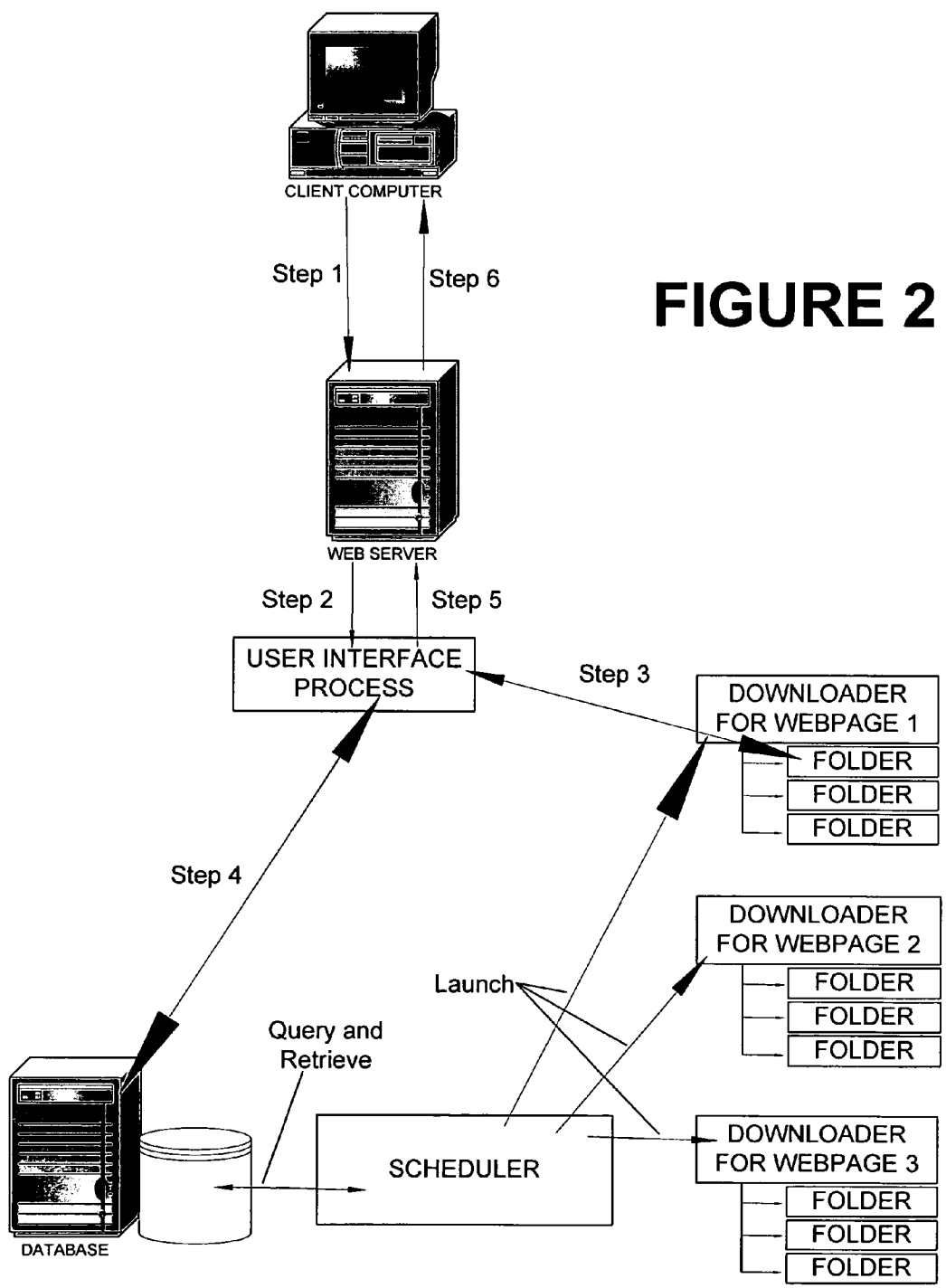
FIG. 2 is a schematic diagram illustrating embodiments of a system for generating the exemplary interactive display of FIG. 1(C)

To support the display of FIG. 1(C), various systems and methods can be implemented in such a computing environment to gather the webpage and the data. Various embodiments of these systems and methods may be based on FIG. 2, which provides a diagram that illustrates computers connected and running processes in such a way as to provide the display of FIG. 1(C). In general, FIG. 2 provides a number of steps involving a client computer, a web server, a database, and files downloaded by downloaders. FIG. 2 also illustrates a scheduler, which provides additional functions, such as querying and retrieving information from the database and launching downloaders.

The exemplary process of FIG. 2 may begin when a client computer requests a report regarding a tracked webpage. Step 1, as illustrated, represents a message from a client computing devise to a web server that a report is requested. The term "web server" refers to a likely scenario for implementation of the present invention, namely, where tracked webpages reside on the World Wide Web. The tracked webpages may also reside on networks other than the World Wide Web, however. In a non-World Wide Web context, the web server of FIG. 2 could be appropriately referred to as a "local area network server" or simply a "server." The web server may also be referred to as an Application Service Provider ("ASP") because it provides an application for end users (i.e., users of the client computer).

The web server may run a User Interface (UI) process. Step 2 represents the web server passing a message from a client computer to a UI. The UI may be, for example, a NET process using a .NET framework. NET is a framework for web services and component software produced by MICROSOFT®. Other such frameworks are also extant, and may similarly be used to implement the UI. For example, the UI could be implemented using Java 2 Platform, Enterprise Edition, produced by SUN MICROSYSTEMS®. The UI will be described in greater detail below.

Step 3 in FIG. 2 represents retrieval of a downloaded webpage by the UI. This can be accomplished by scanning folders where files associated with tracked webpages have been deposited by one or more downloaders. The folders of FIG. 2 are not shown to reside on any particular computing device. As with any processes and/or data storage in a computer network, the files may reside anywhere, including any of the computing devices shown in FIG. 2 or any other devices attached to the network illustrated in FIG. 2.

Step 4 in FIG. 2 illustrates the retrieval of data about the requested tracked webpage. As shown in FIG. 2, this can be accomplished by the UI. The data may reside in a database, as shown in FIG. 2, or in any other location that supports the electronic storage of data. In one embodiment of the invention, the data may be stored in the same database as a list of tracked webpages accessed by a scheduler, as will be explained below in connection with FIG. 2. Note that FIG. 2 does not demonstrate the method of initially acquiring the data that is stored in the database. The data may be acquired by any number of techniques known in the art, allowing for the collection of various types and amounts of data. A complete explanation of the acquisition of data is not described here to avoid unnecessary distraction from the more important aspects of the invention.

Step 5 of FIG. 2 represents the preparation of a response by a UI in the form of a final report optionally including a copy of the requested tracked webpage and a presentation of correlated data. In other words, the UI has gathered the webpage and the data, and it prepares that information to provide the display of FIG. 1(C). Step 6 represents the delivery of a final report to a client computer.

Also illustrated in FIG. 2 is the interaction between a scheduler and a database. As described in greater detail below, a scheduler may query a database for a list of tracked webpages and schedule download times for the webpages. In connection with this retrieval, the scheduler may acquire the webpage URL as well as any time zone, codepage, or other information that may be useful in downloading the webpage and associated files.

The scheduler of FIG. 2 also interacts with one or more downloaders. As illustrated, the scheduler may in fact launch downloaders for the purpose of downloading a webpage or webpages at a predetermined interval. The downloaders, in turn, retrieve tracked webpages, and can also retrieve any associated files such as image files, style sheet files, or script files, and place them in a target directory.

The user interface. Exploring several aspects of FIG. 2 in greater detail, recall that the web server may provide a User Interface (UI) webpage to a client computer. The UI may allow a user at a client computer to select a webpage that he or she wants to analyze. The user may also be permitted to select the point in time at which he or she would like to view the webpage. For example, the user may want to see the webpage as it was yesterday, a month ago, or a year ago. In case of an archive report, the UI may enforce a requirement that the user select a date and hour of interest. This information can then be used by the UI to compute a final directory from which the webpage should be drawn.

Other embodiments may allow the user to view the webpage in real time or near real time conditions. In one example of generating a real time report, the UI could compute the local date and hour for the webpage using time zone information extracted from a database or other source of time zone information associated with the webpage. See below for a description how the present invention may be used in conjunction with time stamps that reflect a local time for the webpage. The UI could then compute the name of a final directory where the latest version of the webpage is stored. This computation may be accomplished using, for example, a config setting such as "RealTimeHistoricalDirectory," in conjunction with a parsed webpage name and the local date and time. Using this date time computation, the UI can always pick up the latest webpage downloaded into a directory (as will be explained below) providing real time or very near real time images of the requested page (e.g., every five minutes).

In various embodiments, the UI may parse a webpage name upon selection of a webpage by a user. As will be explained further in later sections, this is because the webpage can be downloaded into a target directory that may be named based on the name of the webpage, but not exactly matching the webpage name. By parsing the webpage name, the UI may be made able to recognize the target directory where the downloaded webpage is stored. In other embodiments, the UI may accomplish other tasks based on a type of report requested. For example, if a certain type of data or data organization is requested by a user, the UI may add or subtract from a parsed webpage name to ensure that proper data is retrieved.

In addition to identification of the target directory from which to retrieve a webpage, the UI may retrieve data from a database. In exemplary detail, determination of what data to retrieve may be made with reference to a LinkData.xml file created by a downloader (see below for a description of a downloader for use in conjunction with the present invention). Those skilled in the art will recognize that the LinkData file could be in Extensible Mark-Up Language (XML) format, or in any other format that provides the UI with information about the data that is to be retrieved. The contents of this file may be sent to a database, as shown in FIG. 2, to retrieve data for the specified links of interest, or any other desired data. This file may be used to reduce the volume of data transferred from the database to UI. Without this parameter, the database might not be able to identify which links were displayed on a webpage at a particular time, and so may wind up sending out more data about links than is necessary.

Figure 3:
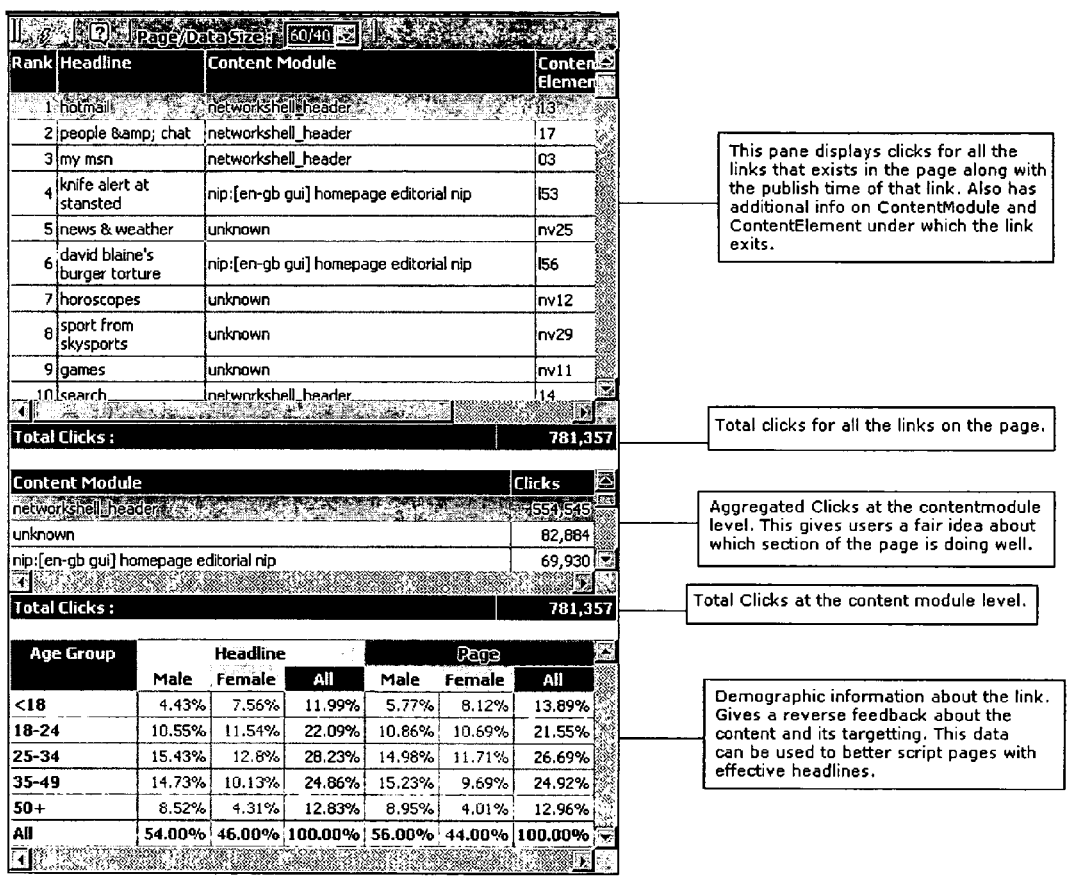
FIG. 3 is a close-up view of the data display portion of FIG. 1(D), with a more detailed description of data that may be displayed.

The retrieved webpage and retrieved data may by arranged by the UI in any useful way. Refer to FIG. 3, which provides a close-up view of part of FIG. 1(D), for one exemplary layout of data in which the data is layered into three tables. As shown in FIG. 2, the "links box" of FIG. 1(D) contains data related to the headline, content module and content element (content elements are a subgroup of related links within a content module) associated with a link, and the number of clicks the link received. The "content modules box" of FIG. 1(D) contains aggregated data on content modules and the total clicks associated with the content module. This gives a summary picture of "how well" a part of the page is doing. The "third box" of FIG. 1(D) contains demographic data and gives a breakdown of male and female clicks as well clicks associated with various age groups. Once again, the data and data organization shown here is one useful layout of data, and those skilled in the art will readily appreciate that different data and data formats may be easily substituted.

The UI may also implement the highlighting aspects of the display, as explained in FIG. 1 and accompanying text.

In various embodiments, the UI may be equipped with client side "event handlers" which can be invoked in the event that a user indicates, via mouseover or in some other fashion, an aspect of a webpage display or of a data display. By way of example and not limitation, if the user indicates a link on the webpage, the UI event handlers for "onmouseover" and "onmouseout" are invoked. Attributes for enabling event handlers could have been conveniently inserted into a webpage when the webpage was downloaded, or at any other time.

Further to the concept of the event handlers, this aspect of the invention can be used in conjunction with correlated links from a downloaded webpage and corresponding data. For example, each of the links of a webpage can be "hashed" when the webpage is downloaded. "Hashing" refers to separating the name elements of a link in some predetermined way, often using a hashing algorithm, which may divide the various uniform resource locator (URL) segments with a pound (#) sign. This hash may be used to name webpage links by allowing the downloader to add an HTML identification attribute in a webpage. The element that initially gathers data for storage in a database (which will be referred to here as a "sniffer") may be capable of hashing the link URLs of a webpage in the same way, i.e., by using the same algorithm to hash the link URL prior to loading the link URL and associated clickthrough data into a database. When the UI gets data from a database, and retrieves the desired webpage, the corresponding hashed URLs can be identified. The use of a hash, in this regard, ensures accurate matching of link information while minimizing the amount of network traffic pertaining to identifying links.

When a mouseover event is invoked from the webpage, it may initiate a call for an aspect of the data display with the same identifier (which may be a hashed link as described above). One exemplary function that could be invoked by the call would search in a first data display pane (the links box of FIG. 3) to identify a row which has an exact matching row identifier. If a matching identifier is found, the function could highlight it. The function then identifies the associated content module from this highlighted row and highlights the associated content module in a second data display pane (e.g., the content modules box of FIG. 3). The function may also filter out a pre-fetched set of demographic data using the queried identifier, and proceed to display the demographic data in a third data display pane (e.g., the third box of FIG. 3).

A similar set of events happen when a mouseover event is triggered on the data display portion. For example, a mouseover event in a first data display pane can initiate a call for an aspect of the webpage with the same identifier (which may be a hashed link). This could invoke a function that would search the webpage for a matching identifier, etc. Note that any method of highlighting can be used to indicate the correlating aspects of the webpage and data. For example, highlighting may be done by changing the background color surrounding the associated link, content module, or row. Text may be enlarged, a zoom-in function may be invoked, arrows may point, etc. For example, when highlighting the webpage link associated with a row of the data display, an additional function call made to the webpage could highlight the related link inside the webpage using different background colors and increasing the font size.

In various embodiments of the present invention, other components involved in downloading webpages may be referred to as a "scheduler," and a "downloader." These elements will be described serially.

The scheduler. In various embodiments, a scheduler may be provided that is capable of accessing a list containing information about webpages to be tracked and computing a target directory for webpages on the list. The term "tracked" is used here refer to collection of data about a webpage. A "tracked" webpage is one for which clickthrough or impression data may be gathered, in addition to any other useful data, such as demographic data (gender, age, profession, marital status, etc.) about the users of a webpage. Clickthrough data provides the number of times links on a webpage have been clicked. Impression data provides the number of times a webpage has been accessed. The invention is not limited to any particular data variety or to the amount of data collected.

Figure 5:
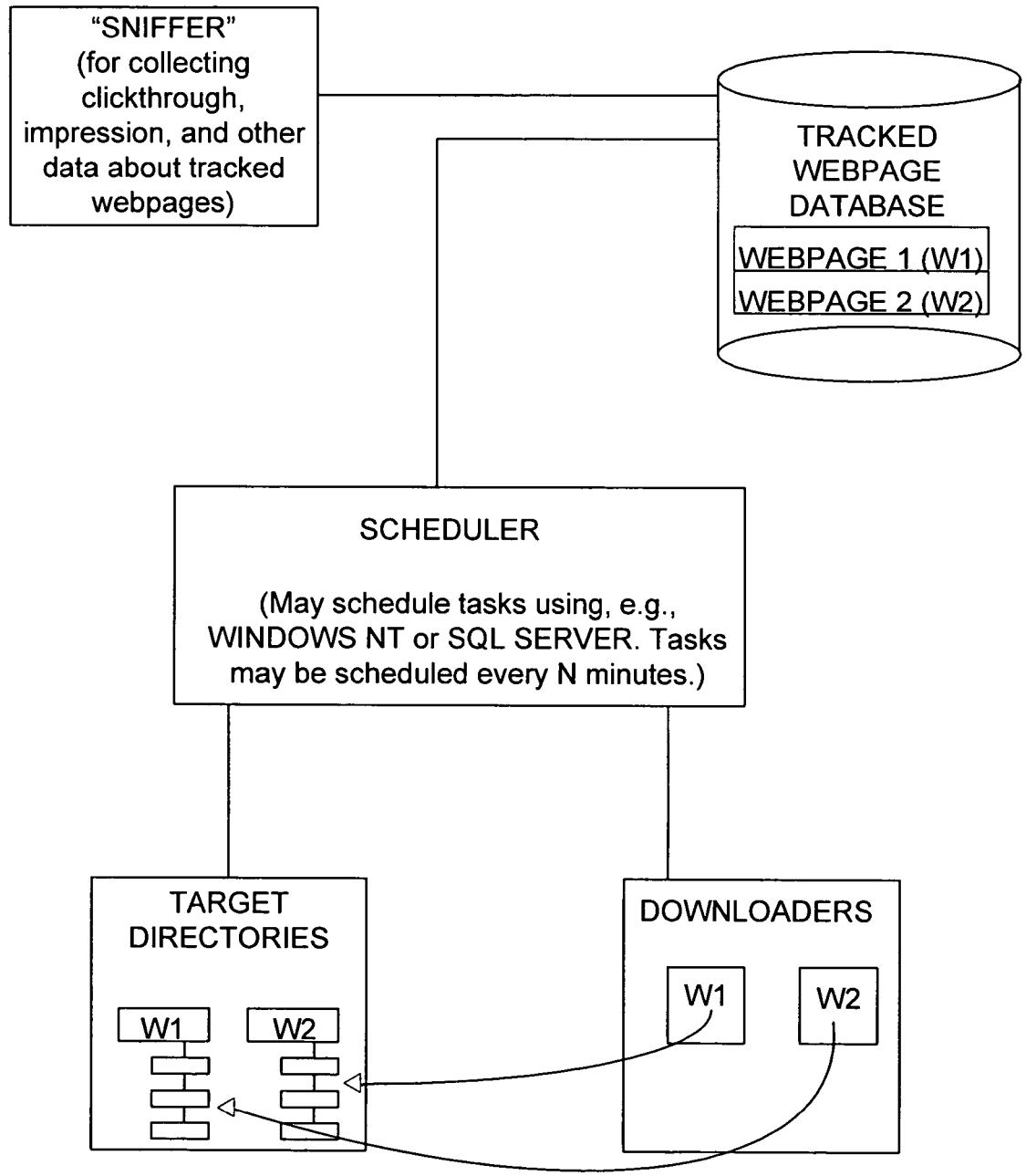
FIG. 5 is a more detailed view of a scheduler, such as the scheduler of FIG. 2, and illustrates some of the functions a scheduler may perform.

Various embodiments of the present invention may provide a scheduler that performs the operations illustrated in FIG. 5. In general, with reference to FIG. 5, the scheduler may access and/or maintain a list of tracked webpages on a database. In FIG. 5, the list of tracked webpages is depicted by Webpage 1 and Webpage 2 in the tracked database. Any number of webpages may be tracked in accordance with the present invention. Any type of webpage may also be tracked, whether the webpage is available generally on the Internet, or is restricted to internal (intranet) use for a particular subgroup. As further illustrated in FIG. 5, the scheduler may compute target directories for tracked webpages. This process may occur as often as desired, and parts of the various computed target directories may be time stamped and archived, so that copies of the tracked webpages remain available even as current webpages change. The scheduler may also launch downloaders for tracked webpages. The downloaders, as described in detail below, generally perform the function of downloading tracked webpages into target directories computed by the scheduler.

In one embodiment, a scheduler can access a list of the webpages that are to be tracked. The scheduler may also access information regarding when webpages are scheduled for download. Such access may be accomplished by connecting to a database and scanning a predefined table. By keeping a list of webpages scheduled for download in a database, the invention may provide additional flexibility in adding new webpages for tracking and removing webpages from tracking at any time.

The list of webpages accessed by the scheduler may also be correlated to collected data, such as click-through and impression data, which is collected for the tracked webpages. This data may be collected, for example, by a sniffer, as illustrated in FIG. 5, and stored in a table that is correlated to the list of tracked webpages. Such data may be collected via conventional techniques involving a sniffer or via any other techniques in accordance with present practice and future developments in the art. The use of sniffers and, generally, means of collecting clickthrough and impression data is known in the art and is not described in detail in this description to avoid distraction from the more important aspects of the invention.

In various other embodiments, particularly when the present invention is intended for use across multiple time zones, the scheduler may also access a list of local time zone information for tracked webpages. By tracking webpages with reference to local time zone information, the invention optionally provides the added advantage of adjusting data to the local time of the owner of the webpage. This allows users of the present invention to peruse data without the need for time zone conversion calculations, which could become cumbersome. For example, consider the situation of a commercial website owner in New Delhi, India. The website sells baked goods. If users of the site click on a "muffins" link twice as much in the A.M. hours as in the P.M. hours, and click on a "naan" link more often in the evening hours, the webpage owner may find that information useful. This information may not be readily apparent to such a website owner, however, if the data provided appears according to the time zone of (for example) Seattle, Wash.

The scheduler may also optionally provide the function of computing a target directory for each webpage. In such an embodiment, the scheduler can create a new folder (if such a folder does not already exist) under a rootdirectory and use a target webpage name to name the new folder. For example, if a rootdirectory value is:

C:\Inetpub\wwwroot\NetMetrix\RealTime\Historical and the downloaded webpage value is:

http://ca.msn.com the scheduler might create a folder called:

C:\Inetpub\wwwroot\NetMetrix\RealTime\Historical\camsncom

The scheduler may then compute a local date and hour for a webpage based on the domain and local time zone information. To calculate the local time, the scheduler may use, for example, a MICROSOFT WINDOWS® Application Programming Interface (API) call using the time zone information specified for each webpage domain. The local date and hour can be provided in any format, including the standard <MM>_<DD>_<YYYY>_HH format. It may be beneficial to pad single month, day and hour digits with a zero for consistency (in other words, September is 09, October is 10, etc.). Using the result of this computation, the scheduler may create and name another folder. For example, if the computed local date and time is Sep. 14, 2003 11:00 p.m., then the final file created could be named:

C:\Inetpub\wwwroot\NetMetrix\RealTime\Historical\camsncom\09_14_2003_23

The above values may be used as a final target directory for the downloader config file (see below for a description of the downloader). One way to accomplish this is for computed values to be copied by the scheduler into a downloader config file. Refer to the description of the downloader config file, below, for its functionality.

The scheduler component may take the form of an executable that is capable of launching a downloader (or downloaders, see below for further description) at predefined temporal intervals. In this embodiment, the scheduler executable can be driven by a "config" file, the location of which can be specified, for example, at run time using a command prompt.

A sample config file is provided in FIG. 6. A brief description of each element in the illustrated config file may be instructive in providing a view of this particular embodiment of the invention:

rootdirectory: This representative parameter relates to the creation of a target directory for the webpages on the list accessed by the scheduler. The rootdirectory specifies a root folder into which webpages may be downloaded, as described above.

scriptfile, proxy, downloadtimeout, and downloadretry: These representative parameters may be optionally copied by the scheduler into the downloader's config file. Refer to the description of the downloader's config file, below, for a description of the various functions of these exemplary parameters.

exefullpathfile: This representative parameter can specify a path filename of the downloader executable. The scheduler optionally uses this value to launch an instance of a downloader for the various tracked webpages when the scheduled time to download them arises.

connection: This representative parameter can be used to specify a database server name, database name and/or other connection string parameters. This value may be used by the scheduler to connect to the database and retrieve webpages to be downloaded. It may also be used to retrieve additional codepage and local time zone information.

In the embodiment described here, the scheduler creates a target directory, and also creates a config.xml file under the target directory with all the necessary parameters. In order to achieve consistency and reliability of downloading pages, which is useful in the context of archiving webpages, the scheduler may be arranged in such a way that it will copy files from any previous folders into new folders upon creation of the new folders.

The scheduler may be capable of launching one or more downloaders (as described below) using the value specified in the exefullpathfile, for example, and pointing the downloaders to the config.xml file created under the target directory. Referring back to FIG. 5, notice that the downloaders may be associated with a particular target directory. It may prove beneficial to launch one downloader for each tracked webpage. This approach achieves multiple processing and ensures reliability of webpages as each downloader process is independent of the other downloader processes. Failures in one downloader would not interfere with other downloading processes.

It may also prove beneficial for the scheduler to maintain an "ErrorLog.txt" file for reporting scheduler activity (both success and failure). The ErrorLog.txt file can in turn be monitored by other operations capable of identifying problems. Those skilled in the art will recognize that such a file may be in simple text (".txt") format, or any other format that may be accessed by the various applications of the system.

The scheduler process can be scheduled using any common task scheduler. Exemplary programs that provide task schedulers which are appropriate for use in conjunction with this embodiment of the invention are NT TASK SCHEDULER or SQL SERVER provided by MICROSOFT®. The scheduled tasks can be run as often as needed. To provide real time or near real time data about tracked webpages, tasks could be scheduled multiple times daily. If pages do not change as fast, or thoroughness is not as important, tasks could be scheduled at greater intervals.

Downloader: Various embodiments of the present invention may additionally provide for downloaders that are capable of scrapping specified webpages and downloading webpage source code into target directories created by a scheduler. "Scrapping" as used here refers generally to marking a file for movement, e.g., by renaming, copying, or deletion. In addition to the webpage, the downloader may provide for scrapping and downloading all related resources such as images, styles and script files. The downloader may also initiate updating of the path references of the downloaded webpages to refer to downloaded local files.

Figure 7:
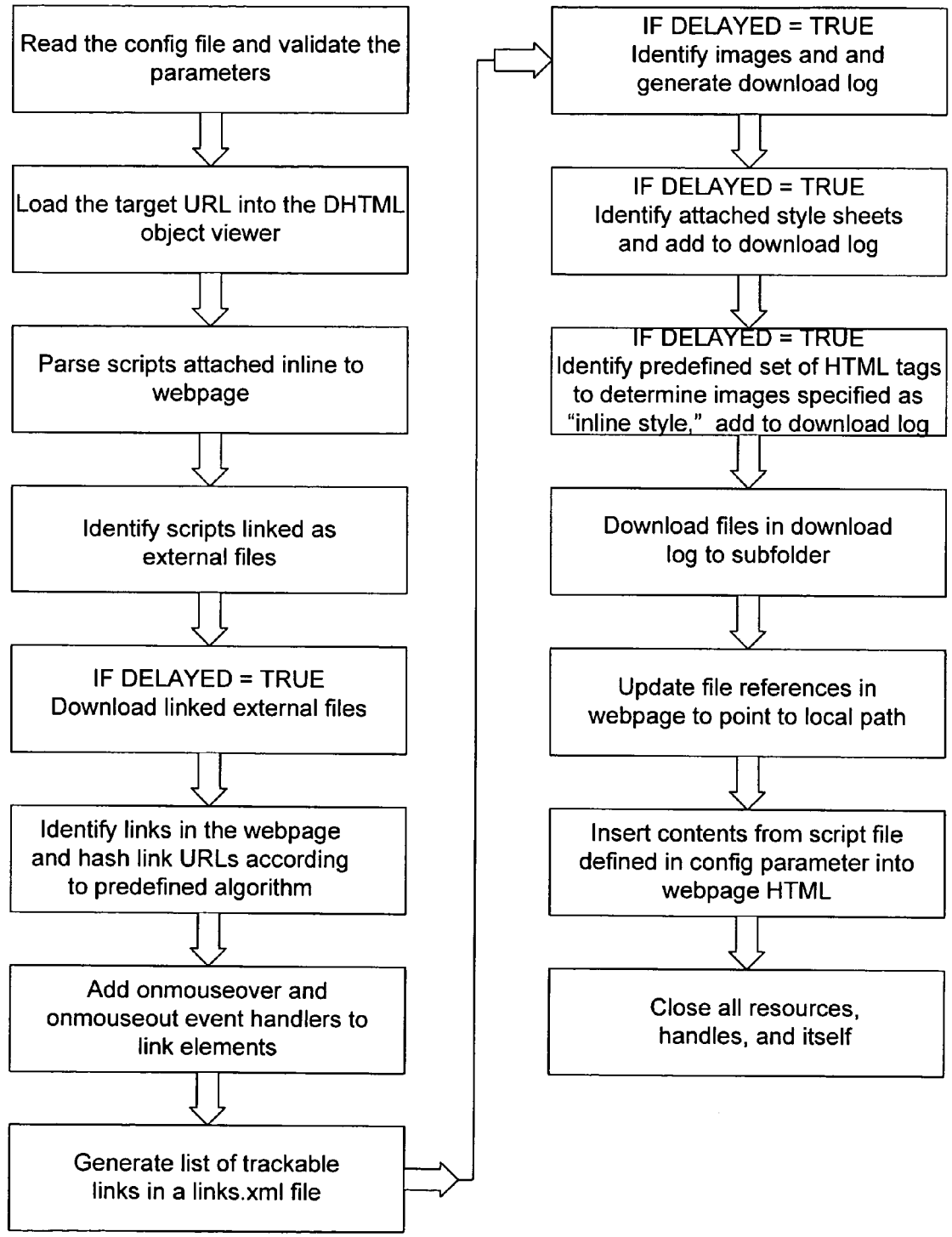
FIG. 7 is a flowchart that provides an exemplary sequence of steps a downloader may perform when downloading a webpage and supporting files into a target directory.

By way of example but not limitation, the downloader may engage in a sequence of events when it is pointed to a config file (pointing the downloader to a config file may be performed by the scheduler, see above). This sequence generally supports the results described above, i.e., the access and display of webpages in conjunction with data. While the sequence is associated here with the function of the downloader, those skilled in the art will recognize that systems may be developed to provide some of these functions in other components. Additionally, it should be apparent that while a sequence is provided for clarity of explanation, some of the events in the sequence need not be performed precisely at the described place in the sequence. FIG. 7 provides a flowchart demonstrating the basic tasks that may be performed in the sequence.

First, with reference to FIG. 7, note that the invention may optionally be used in conjunction with a "delayed" function. Several of the steps are performed only if a "DELAYED" parameter is set to "TRUE." The delayed attribute may be specified in the config file. If delayed is set to true, the downloader would download both the target webpage itself and all the files associated with the webpage. It would also update the path references. If DELAYED is set to "FALSE" (not shown in FIG. 7) then the downloader would download a target webpage, but would not download the related files or update path references. One advantage of providing for a delayed function is variability of the speed at which a download may be accomplished. In the quick mode (DELAYED=FALSE), the downloader does not perform additional downloads of associated files, nor does it parse or update source files. The additional speed provided by eliminating these steps provides the UI with a prompt response from the downloader, which can be beneficial where the present invention is used to provide data in real time. Because the webpage references previously downloaded into the target directory are not updated, prior downloaded images will continue to point to the proper source (which may be assumed to exist for some time). The webpage can appear exactly as original even though its source may be modified during the download process, for example, by adding additional event handlers for mouseover and mouseout.

In the case of a delayed processing (DELAYED=TRUE) the entire webpage may be downloaded for archival. The names of files associated with the webpage to be downloaded can be hashed to form a target filename. This helps in handling irregular filenames, filenames with unwanted characters (such as "querystring" and the like), and provides reliability in a naming convention.

Remaining with FIG. 7, the downloader may begin by reading a config.xml file in the target directory. For an explanation of the config file, see FIG. 8 and accompanying text. Next, the downloader can load a target URL into a Dynamic Hyper Text Markup Language (DHTML) object viewer. The downloader may then parse the scripts attached inline to the webpage. Next, the downloader can identify the scripts linked as external files. If delayed is set to true, the downloader may proceed to download some or all of the external files. If delayed is set to false, as should be clear from the description of the delayed function above, the downloader is in a quick download mode and need not download external files. Next, the downloader can identify links in the webpage and hash the URLs according to a predefined algorithm. If the hash matches a hash generated at the point where data is captured (e.g., at a sniffer) the UI will later be able to correlate the links on a webpage with stored data. The downloader may at this time add onmouseover and onmouseout event handlers, as described above, to the link elements of a downloaded webpage. Remember, these event handlers can later be used to call sub-routines in the UI which are used to link data with the HTML elements of the webpage.

The downloader may create a list of the various trackable links found in the webpage at the time of download. This list can be stored to links.xml file, or in some other format for later use by the UI. This file may then be used by the UI to query the database where data is stored.

While downloading a webpage, the downloader may generate a download log, which is a list of additional files to be downloaded. As shown in the top right corner of FIG. 7, the download log can be generated when a "delayed" parameter is set to "true." In accordance with this aspect of the invention, when delayed is set to true the downloader could identify the images used on the webpage and log them into a collection (a download log) to be used for downloading. The next steps in the sequence are simply to demonstrate that any aspect of a webpage that requires downloading may be collected into a download log. As shown, any attached style sheets can be identified and placed in a download log. Style sheets may be parsed to identify any linked images specified therein, after which the linked images can also be added to a download log. Any "inline style" images (as determined by a predetermined set of HTML tags) may also be added to a download log. The above list of aspects of a webpage that can be logged for later download is not intended to be comprehensive, but to demonstrate the concept of a download log and how it is used in conjunction with the present invention.

As illustrated in FIG. 7, the downloader may proceed to download a collection of files specified in a download log. To save time, the downloader may first check if any files in the log already exist locally. If so, the downloader may remove such files from the log to prevent unnecessary use of resources in a needless download. Downloaded files can be saved in a sub folder of the target directory, for example a folder named "Others."

After downloading the various files associated with a webpage, the downloader can update the webpage and downloaded files to properly reference and point to each other in the local path of the target directory. This is because the webpage and associated files, prior to download, referenced their respective locations on an internet server, rather that within the target directory to which copies of the webpage and its associated files have been saved. Such updates may be done, for example, in the original source HTML of a webpage, in the original source HTML of style sheets, and in any additional files that require updating in order to properly reference a local file path.

The downloader may then insert the contents of a script file (which could be identified in a config parameter, as described below) into the webpage HTML. The contents of the inserted file can be used to support any number of potential functions, including highlighting or other functions in accordance with the desired presentation of a webpage alongside a data display. In one simple embodiment, the file supports raising and handling of events needed by the UI to co-relate data with page elements.

Finally, FIG. 7 illustrates that the downloader may close all resources that were opened during the download process, as well as any handles and itself.

FIG. 8 illustrates a config file for use by the downloader in conjunction with various embodiments of the present invention. A brief description of each element in the config file of FIG. 8 is given below:

Delayed: This parameter can be used to determine whether a downloader should download supporting files in addition to a tracked webpage. As described in this embodiment, a delayed value of true means supporting files are to be downloaded. Supporting files include image files, script files, style sheet files, and any other file linked with the webpage. A delayed value of false means downloading and scrapping the tracked webpage is sufficient.

Sourcepage: This parameter may be used to define the name of a tracked webpage to be downloaded.

Codepage: This parameter may be used to define a default codepage of a tracked webpage. For example, Western European, Japanese, Chinese and Asian language character sets are associated with different encoding that may not be recognized. The "codepage" parameter can help the downloader to properly handle webpage encoding and different character sets.

Targetdirectory: This parameter can be used to define target folders into which a tracked webpage may be downloaded. The path may be initially computed by a scheduler using a rootdirectory parameter, as described above. Note that another folder may be created under the target directory, namely the "Other" folder, as described in FIG. 7 and accompanying text, which is optionally the name of the folder that can contain downloaded supporting files associated with a tracked webpage.

Scriptfile: This parameter can be used to define a path filename of a file that may be inserted into a downloaded webpage to support event handlers that are inserted into a webpage. The file to be inserted may be, for example, a JavaScript file, or other file type that can provide similar support for event handlers. The contents of the inserted file can be used to support any number of potential highlighting or other functions in accordance with the desired presentation of the webpage alongside data. In one simple embodiment, the file supports raising and handling of events needed by the UI to co-relate data with page elements.

Proxy: This parameter can be used to define the address of a proxy server that the downloader can use to connect to the internet, intranet, or other computer network on which the target webpage may be found. This will especially be of use in situations where the internet is not directly accessible, e.g. inside a corporate network environment. Providing the downloader with a proxy parameter may be useful in that the downloader may operate more smoothly when it has sufficient control of its own connection to properly implement a configuration while downloading. Refer to the downloadtimeout and downloadretry parameters below for further explanation of how the downloader can be configured for flexibility in downloading resources. This flexibility allows optimization of download times and sequences for resources.

Downloadtimeout: This parameter may be used to specify a timeout period for the downloader used while downloading supporting files such as images, scripts and style sheets. Such a downloadtimeout parameter may be useful in settings where for any reason the downloader has lost adequate connection to the servers storing the tracked webpage.

Downloadretry: This parameter can be used to specify a number of retries the downloader can make if it fails to download a webpage or supporting file on the first try.

Finally, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the user interface of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

Aspects(s) of the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed:

1. A method for providing a webpage data display, comprising:
   computing a target directory for a tracked webpage;
   scheduling periodic downloads of the tracked webpage into the target directory;
   downloading the tracked webpage into the target directory;
   accessing clickthrough data associated with links of the tracked webpage; and
   combining the tracked webpage as stored in the target directory and the clickthrough data associated with the links of the tracked webpage into a final report capable of being displayed, wherein the final report simultaneously displays the tracked webpage in a webpage display portion of said final report and the clickthrough data in a data display portion of said final report, and wherein said final report is configured to automatically highlight a webpage link in said webpage display portion of said final report when corresponding data is indicated in said data display portion of said final report and is further configured to highlight clickthrough data in said data display portion of said final report when a corresponding webpage link is indicated in said webpage display portion of said final report.

2. A method of claim 1, wherein the final report displays corresponding demographic data about the people who clicked a link on the tracked webpage when a feature of either the tracked webpage or the clickthrough data is indicated.

3. The method of claim 1, further comprising storing time zone information for at least one of the clickthrough data and the tracked webpage.

4. A method for scheduling a periodic download of tracked webpages, comprising:
   maintaining a list of one or more tracked webpages;
   computing one or more target directories into which a tracked webpage from the list of one or more tracked webpages can be downloaded;
   scheduling the periodic download of the tracked webpage into the one or more target directories;
   launching a downloader capable of downloading the tracked webpage into the one or more target directories;
   downloading the tracked webpage;
   storing clickthrough data associated with the links of the tracked webpage; and
   combining the tracked webpage as stored in the target directory and the clickthrough data associated with the links of the tracked webpage into a final report capable of being displayed, wherein the final report simultaneously displays the tracked webpage in a webpage display portion of said final report and the clickthrough data in a data display portion of said final report, and wherein said final report is configured to automatically highlight a webpage link in said webpage display portion of said final report when corresponding data is indicated in said data display portion of said final report and is further configured to highlight clickthrough data in said data display portion of said final report when a corresponding webpage link is indicated in said webpage display portion of said final report.

5. A method according claim 4, wherein the final report contains clickthrough data that is adjusted to reflect the time zone of the geographical area that the webpage is designed to serve.

6. A method according to claim 1, wherein the periodic download of the tracked webpage is scheduled such that the one or more target directories are substantaially likely to contain a copy of the tracked webpage that reflects any recent changes to the webpage.

7. A method according to claim 4 wherein the downloader hashes link Uniform Resource Locators (URLs) when the tracked webpage is located.

8. A method for downloading a tracked webpage using a downloader, comprising:
   obtaining a target uniform resource locator (URL) for a tracked webpage;
   hashing one or more link URLs found in the tracked webpage according to a predefined algorithm;
   generating a list of hashed link URLs to facilitate access to clickthrough data;
   downloading the tracked webpage into a target directory;
   updating file references in the downloaded tracked webpage to refer to a local path, wherein the local path indicates the target directory where the tracked webpage is stored;
   storing clickthrough data regarding a tracked webpage, wherein the clickthrough data is identified by hashed link URLs that are hashed according to the predefined algorithm used in hashing the one or more link URLs found in the webpage; and
   retrieving the tracked webpage and the clickthrough data regarding the tracked webpage, wherein the retrieved tracked webpage and the clickthrough data regarding the tracked webpage are combined into a final report that simultaneously displays the tracked webpage in a webpage display portion of said final report and the clickthrough data in a data display portion of said final report, and wherein said final report is configured to automatically highlight a webpage link in said webpage display portion of said final report when corresponding data is indicated in said data display portion of said final report and is further configured to highlight clickthrough data in said data display portion of said final report when a corresponding webpage link is indicated in said webpage display portion of said final report.

9. A method according claim 8, wherein the final report contains clickthrough data that is adjusted to reflect the time zone of the geographical area that the webpage is designed to serve.

10. A method according to claim 8, further comprising generating a download log that identifies associated with a tracked webpage.

11. A method according to claim 8, further comprising setting a parameter that defines whether files associated with a tracked webpage will be identified in the download log.

12. A means for providing a webpage data display, comprising:
- means for computing a target directory for a tracked webpage;
- means for scheduling periodic downloads of the tracked webpage into the target directory;
- means for downloading the tracked webpage into the target directory;
- means for accessing clickthrough data associated with links of the tracked webpage; and
- means for combining the tracked webpage as stored in the target directory and the clickthrough data associated with the links of the tracked webpage into a final report capable of being displayed, wherein the final report simultaneously displays the tracked webpage in a webpage display portion of said final report and the clickthrough data in a data display portion of said final report, and wherein said final report is configured to automatically highlight a webpage link in said webpage display portion of said final report when corresponding data is indicated in said data display portion of said final report and is further configured to highlight clickthrough data in said data display portion of said final report when a corresponding webpage link is indicated in said webpage display portion of said final report.

* * * * *